United States Patent
Bohra et al.

(10) Patent No.: US 10,404,570 B2
(45) Date of Patent: Sep. 3, 2019

(54) AUTOMATICALLY DETECTING AN ERROR IN A COMMUNICATION AND AUTOMATICALLY DETERMINING A SOURCE OF THE ERROR

(71) Applicant: Juniper Networks, Inc., Sunnyvale, CA (US)

(72) Inventors: Amit Bohra, Aligarh (IN); Rahul Yashwant Kulkarni, Banglore (IN); Khalid Akhtar Ansari, Bangalore (IN); Karthick Rajamani, Chennai (IN)

(73) Assignee: Juniper Networks, Inc., Sunnyvale, CA (US)

( * ) Notice: Subject to any disclaimer, the term of this patent is extended or adjusted under 35 U.S.C. 154(b) by 424 days.

(21) Appl. No.: 15/198,250

(22) Filed: Jun. 30, 2016

(65) Prior Publication Data
US 2018/0006925 A1    Jan. 4, 2018

(51) Int. Cl.
*H04L 12/26* (2006.01)
*H04L 12/24* (2006.01)
*H04B 10/077* (2013.01)

(52) U.S. Cl.
CPC ......... *H04L 43/16* (2013.01); *H04B 10/0773* (2013.01); *H04L 41/0645* (2013.01); *H04L 43/08* (2013.01); *H04L 43/50* (2013.01)

(58) Field of Classification Search
CPC ..................................................... H04L 43/16
See application file for complete search history.

(56) References Cited

U.S. PATENT DOCUMENTS 7,689,121 B2    3/2010 Peloso et al.
2007/0248020 A1    10/2007 Hoque et al.
(Continued)

FOREIGN PATENT DOCUMENTS

CN    101106424 A    1/2008
CN    101378577 A    3/2009
(Continued)

OTHER PUBLICATIONS

Wikipedia, "Route flapping," https://en.wikipedia.org/wiki/Route_flapping, May 30, 2014, 1 page.
(Continued)

*Primary Examiner* — Suraj M Joshi
(74) *Attorney, Agent, or Firm* — Harrity & Harrity, LLP (57) ABSTRACT

A device may monitor a communication between network devices for an error associated with the communication. The device may detect the error associated with the communication between the network devices. The device may perform a comparison of an error metric and a threshold error metric. The error metric may be associated with the error. The device may determine whether the comparison indicates that the error metric satisfies the threshold error metric. The device may identify a source of the error using a loopback test based on determining whether the comparison indicates that the error metric satisfies the threshold error metric. The device may provide error source information based on identifying the source of the error. The error source information may identify the source of the error.

20 Claims, 7 Drawing Sheets

(56) References Cited

U.S. PATENT DOCUMENTS

2014/0043999 A1 2/2014 Bugenhagen
2016/0182275 A1* 6/2016 Viswanadham ... H04B 10/0771
398/1

FOREIGN PATENT DOCUMENTS

CN 102752125 A 10/2012
CN 103229516 A 7/2013

OTHER PUBLICATIONS

IT Knowledge Exchange, "What is Link Flapping?," http://itknowledgeexchange.techtarget.com/itanswers/what-is-link-flapping/, Sep. 3, 2008, 3 pages.
Wikipedia, "Bit error rate," https://en.wikipedia.org/wiki/Bit_error_rate, Jun. 3, 2016, 5 pages.
Juniper Networks, "Understanding the Loopback Interface," http://www.juniper.net/documentation/en_US/junos15.1/topics/concept/interface-security-loopback-understanding.html, May 8, 2014, 1 page.
Juniper Networks, "Configuring a Loopback Interface," http://www.juniper.net/techpubs/en_US/junos15.1/topics/task/configuration/loopback-interface.html, May 23, 2014, 2 pages.
Wikipedia, "Loopback," https://en.wikipedia.org/wiki/Loopback, Apr. 13, 2016, 3 pages.
Juniper Networks, "Understanding Ethernet OAM Link Fault Management for ACX Series Routers," https://www.juniper.net/techpubs/en_US/junos12.3/topics/concept/ethernet-oam-lfm.html, Jan. 11, 2013, 2 pages.
Wikipedia, "Network monitoring," https://en.wikipedia.org/wiki/Network_monitoring, Jun. 27, 2016, 3 pages.
Wikipedia, "Clock recovery," https://en.wikipedia.org/wiki/Clock_recovery, Feb. 27, 2013, 1 page.
Extended European Search Report corresponding to EP 16 19 3864, dated May 24, 2017, 7 pages.

* cited by examiner

AUTOMATICALLY DETECTING AN ERROR IN A COMMUNICATION AND AUTOMATICALLY DETERMINING A SOURCE OF THE ERROR

BACKGROUND

A loopback test may include the routing of electronic signals, digital data streams, or flows of items back to a source of the electronic signals. In some cases, the electronic signals may be routed without intentional processing or modification. A loopback test may be used to test a transmission or a transportation infrastructure. When using a loopback test to test connection problems, a device may send a specific pattern of data on a port and may detect the reception of the specific pattern of data on the same port as the port used to send the specific pattern of data.

SUMMARY

According to some possible implementations, a device may include one or more processors to monitor a communication between network devices for an error associated with the communication. The one or more processors may detect the error associated with the communication between the network devices. The one or more processors may perform a comparison of an error metric and a threshold error metric. The error metric may be associated with the error. The one or more processors may determine whether the comparison indicates that the error metric satisfies the threshold error metric. The one or more processors may identify a source of the error using a loopback test based on determining whether the comparison indicates that the error metric satisfies the threshold error metric. The one or more processors may provide error source information based on identifying the source of the error. The error source information may identify the source of the error.

According to some possible implementations, a non-transitory computer-readable medium may store one or more instructions that, when executed by one or more processors, cause the one or more processors to monitor a communication between multiple devices for an error. The error may be associated with at least one of one or more network interface controllers (NICs) of the multiple devices, one or more transceiver components of the multiple devices, or one or more transmission lines between the multiple devices. The one or more instructions may cause the one or more processors to detect the error associated with the communication between the multiple devices. The one or more instructions may cause the one or more processors to determine whether an error metric satisfies a threshold error metric. The one or more instructions may cause the one or more processors to identify a source of the error using a loopback test based on determining whether the error metric satisfies the threshold error metric. The loopback test may be applied to the one or more NICs or the one or more transceiver components. The one or more instructions may cause the one or more processors to provide error source information based on identifying the source of the error.

According to some possible implementations, a method may include monitoring, by a first device, a communication between the first device and a second device. The method may include detecting, by the first device, an error associated with the communication between the first device and the second device. The error may be caused by the first device, the second device, or a transmission line used by the first device and the second device to communicate. The method may include performing, by the first device, a comparison of an error metric and a threshold error metric. The error metric may be determined from the error. The method may include determining, by the first device, that a result of the comparison indicates that the error metric satisfies the threshold error metric. The method may include identifying, by the first device, a source of the error using a loopback test based on determining that the error metric satisfies the threshold error metric. The method may include performing, by the first device, an action based on identifying the source of the error. The action may be associated with the source of the error.

DETAILED DESCRIPTION

The following detailed description of example implementations refers to the accompanying drawings. The same reference numbers in different drawings may identify the same or similar elements.

Network devices may communicate using one or more communication components, such as network interface controllers (NICs) of the network devices, transceiver components of the network devices, and/or a transmission line that connects the network devices. The communication components may degrade over time causing an error in a communication between the network devices.

To identify which of the communication components is causing the error, a network administrator may have to manually test each of the communication components. For example, the network administrator may manually replace the communication components one at a time until the error is eliminated, which may be labor intensive and/or inefficient. As another example, the network administrator may manually apply loopback tests to the communication components (e.g., by handwriting lines of program code, such as executable code, to apply the loopback tests). Manually applying loopback tests may require technical knowledge of which types of loopback tests to apply to the communication components and technical skill to handwrite the lines of program code that apply the loopback tests.

Alternatively, the network administrator may use link monitoring to automatically detect an error on a communications link (e.g., on a physical coding sublayer (PCS) of the communications link) and to take down the entire communications link. Despite enabling the network administrator to identify a communications link that is experiencing an error, this technique still requires manual effort by the network administrator to identify which of the communication components is causing the error.

Implementations described herein enable automatic detection of an error associated with a communication between network devices and enable automatic identification of the particular communication component causing the error. This enables faster, and more accurate, identification of a source of the error (e.g., relative to manual testing to identify the source), thereby reducing network downtime. In addition, automatic identification of the source of an error conserves hardware resources of the network devices that would be used to attempt to execute un-executable or erroneously written handwritten program code and/or to execute duplicate or superfluous handwritten program code during manual testing. Further, this reduces or eliminates the need for manual testing by a network administrator to identify the source of the error, thereby increasing an efficiency of identifying the source of the error.

Figure 1A:
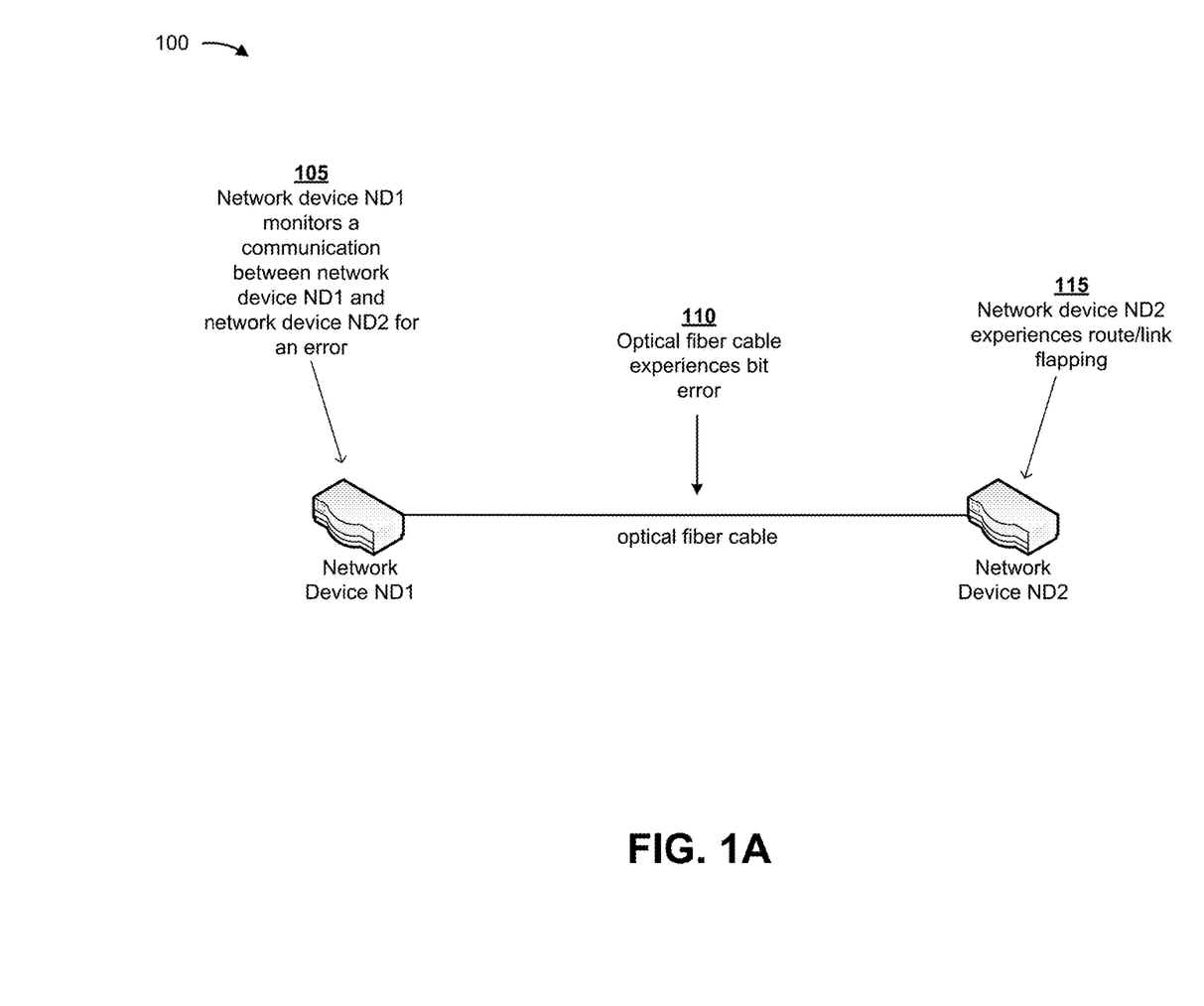
FIGS. 1A-1D are diagrams of an overview of an example implementation described herein.

FIGS. 1A-1D are diagrams of an overview of an example implementation 100 described herein. As shown in FIG. 1A, network device ND1 and network device ND2 may be connected, and communicating, via an optical fiber cable. As shown by reference number 105, network device ND1 may monitor a communication between network device ND1 and network device ND2 for an error. For example, network device ND1 may monitor the communication for a bit error, route/link flapping, a loss of signal error, and/or a frame check sequence (FCS) error. As shown by reference number 110, assume for FIGS. 1A-1D that the optical fiber cable is experiencing a bit error. As shown by reference number 115, assume that network device ND2 experiences route/link flapping.

Figure 1B:
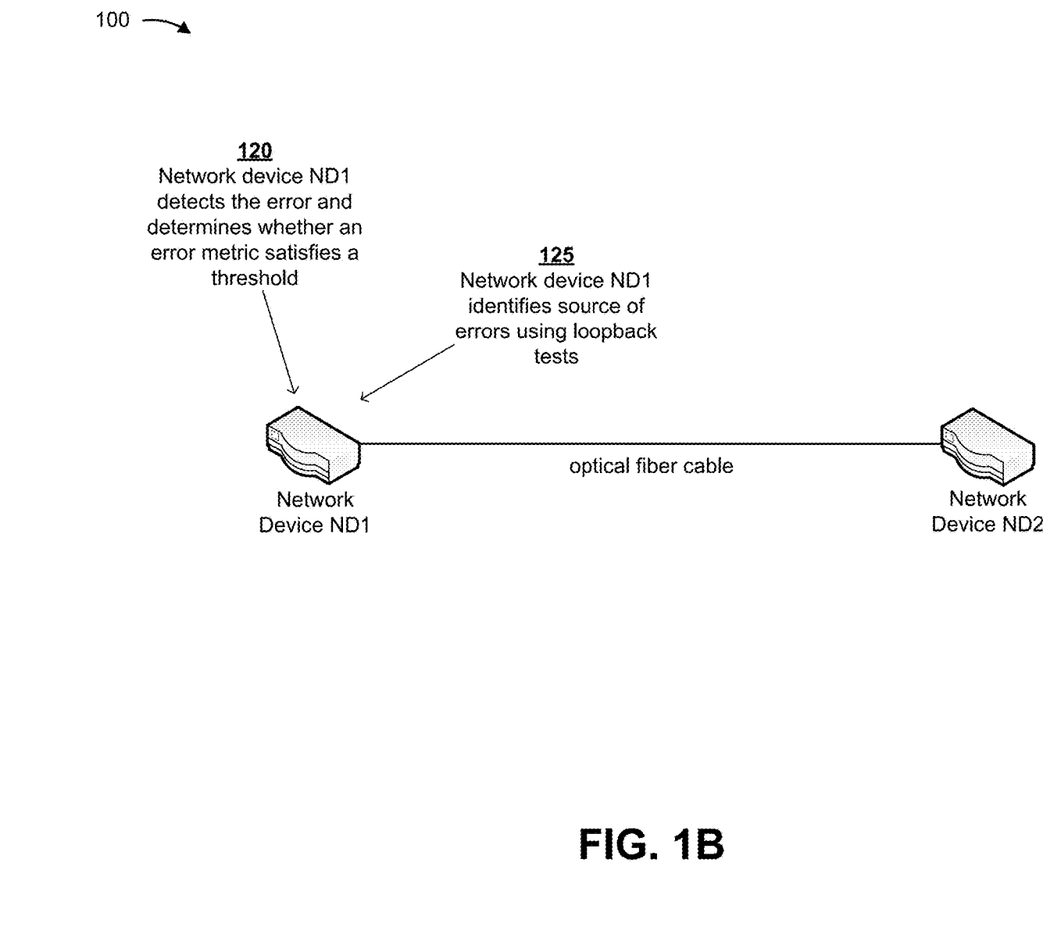

As shown in FIG. 1B, and by reference number 120, network device ND1 may detect the error and determine whether an error metric, associated with the error, satisfies a threshold. For example, network device ND1 may detect a bit error, associated with the optical fiber cable, and determine whether a bit error rate, associated with the bit error, satisfies a threshold bit error rate. As another example, network device ND1 may detect route/link flapping, associated with network device ND2, and determine whether a route/link flapping rate satisfies a threshold route/link flapping rate.

Figure 1C:
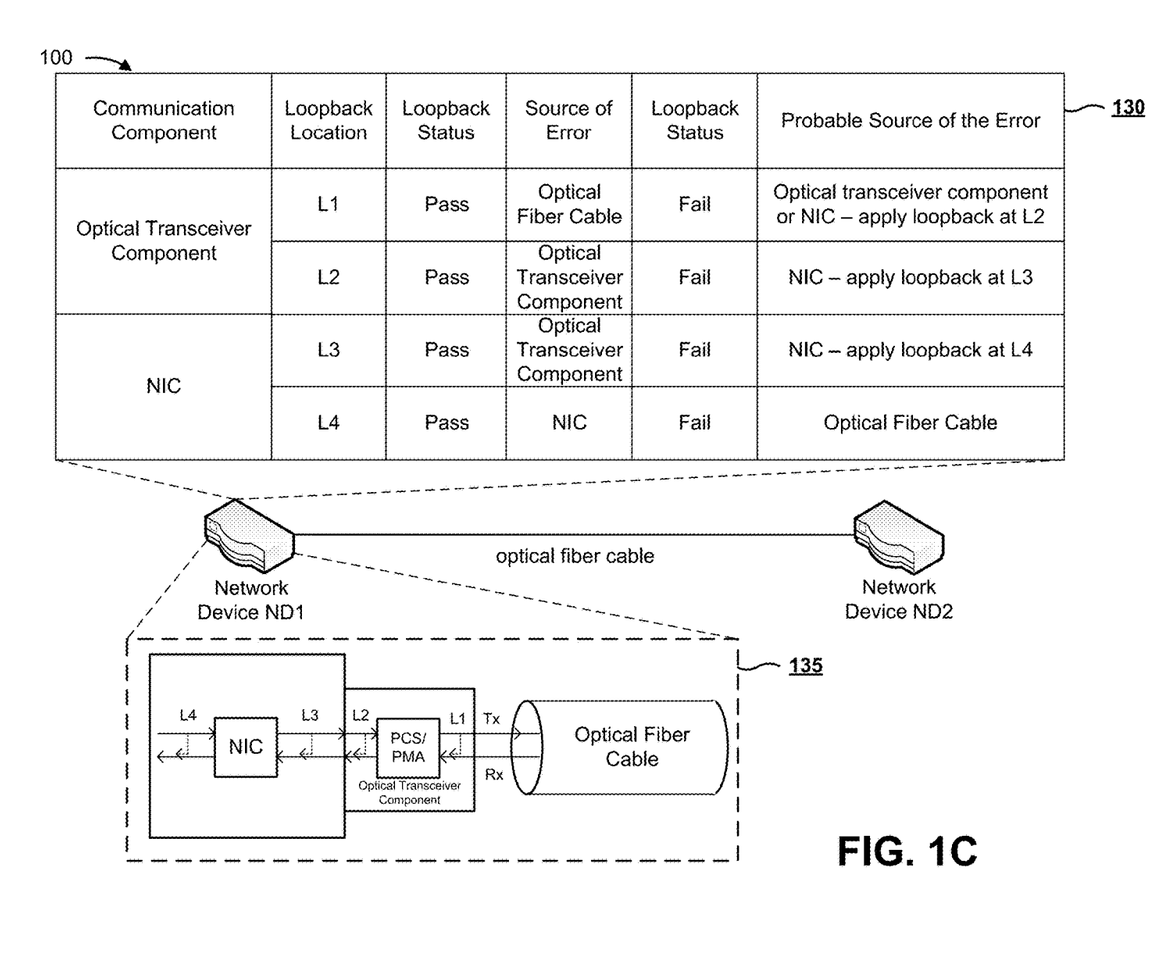
Figure 1D:
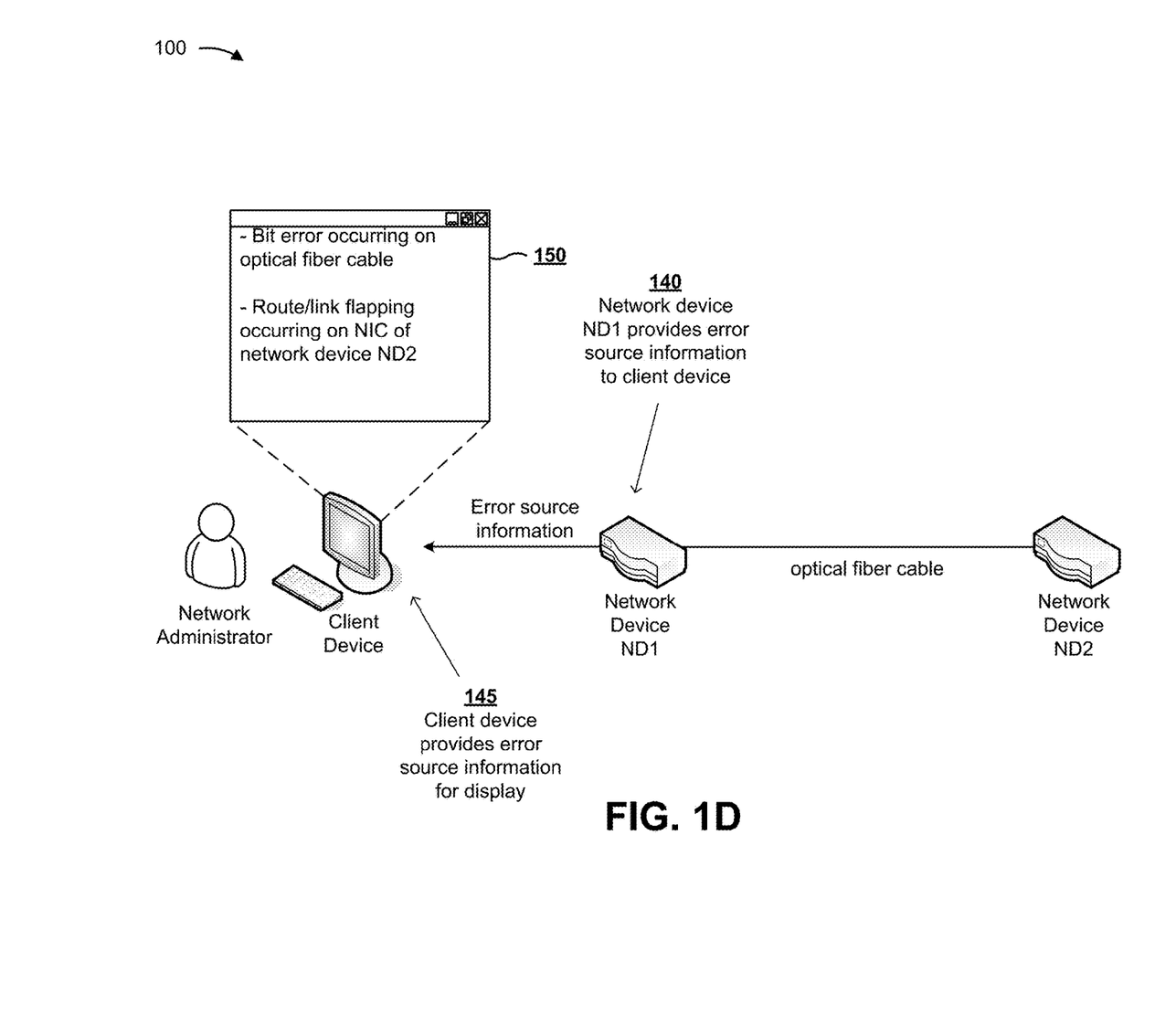

Assume for FIGS. 1B-1D that the error metrics associated with the bit error and the route/link flapping, which were detected by network device ND1, each satisfy a threshold. As shown by reference number 125, network device ND1 may identify a source of the errors using loopback tests. For example, network device ND1 may apply a local loopback test to network device ND1 to determine whether an optical transceiver component and/or a NIC of network device ND1 is the source of an error. As another example, network device ND1 may apply a remote loopback test to network device ND2 to determine whether an optical transceiver component and/or a NIC of network device ND2 is the source of the error.

As shown in FIG. 1C, and by reference number 130, network device ND1 may use a set of rules to determine the source of the error (or probable source of the error) based on applying a loopback test to an optical transceiver component and/or a NIC. As shown by reference number 135, network device ND1 may apply a local loopback test to the optical transceiver component of network device ND1 and/or the NIC of network device ND1 to determine the source of the error.

For example, network device ND1 may apply a local loopback test at location L1 such that a signal in a transmit (Tx) direction is returned in a receive (Rx) direction prior to passing via the optical fiber cable (e.g., as indicated by the dotted arrow associated with location L1). In this case, if the signal is returned undamaged, or is returned with errors that do not satisfy a threshold (e.g., "Pass," as shown by reference number 130), network device ND1 may identify the optical fiber cable as the source of the error. Conversely, if the signal is returned damaged, or is returned with errors that satisfy a threshold (e.g., "Fail," as shown by reference number 130), network device ND1 may identify the optical transceiver component of network device ND1 or the NIC of network device ND1 as the probable source of the error and may apply a local loopback test at location L2 to determine whether the optical transceiver component and/or the NIC is the source of the error.

As another example, network device ND1 may apply the local loopback test at location L2 such that a signal in a Tx direction is returned in an Rx direction prior to passing via a physical coding sublayer (PCS)/physical medium attachment (PMA) of the optical transceiver component (e.g., as indicated by the dotted arrow associated with location L2). In this case, if the signal is returned undamaged, or is returned with errors that do not satisfy a threshold (e.g., "Pass," as shown by reference number 130), network device ND1 may identify the optical transceiver component as the source of the error. Conversely, if the signal is returned damaged, or is returned with errors that satisfy a threshold (e.g., "Fail," as shown by reference number 130), network device ND1 may identify the NIC of network device ND1 as the probable source of the error and may apply a local loopback test at location L3 to determine whether the NIC is the source of the error.

Network device ND1 may apply local loopback tests to the NIC of network device ND1 at location L3 and L4 in manner similar to that described with respect to locations L1 and L2, to determine the source of the error. For example, network device ND1 may apply a local loopback test to location L3 to determine whether a signal that has passed via the NIC and not via the optical transceiver component is damaged or undamaged. As another example, network device ND1 may apply a local loopback test to location L4 to determine whether a signal that has not passed via the NIC is damaged or undamaged. Network device ND1 may apply remote loopback tests to the optical transceiver component and/or NIC of network device ND2, in a manner similar to that described above with respect to local loopback tests applied to network device ND1, to determine whether the optical transceiver component and/or the NIC of network device ND2 is the source of the error.

Assume, for example, that network device ND1 identifies the optical fiber cable as the source of the bit error based on applying one or more loopback tests. Further assume, for example, that network device ND1 identifies the NIC of network device ND2 as the source of the route/link flapping based on applying one or more loopback tests. Further assume, for example, that network device ND1 determines that the optical transceiver components of network devices ND1 and ND2 are not the source of the errors based on applying one or more loopback tests.

As shown in FIG. 1D, and by reference number 140, network device ND1 may provide error source information to a client device. For example, network device ND1 may provide error source information that identifies the NIC of network device ND2 as the source of the route/link flapping and the optical fiber cable as the source of the bit error. As shown by reference number 145, the client device may provide the error source information for display (e.g., via a display of the client device). For example, as shown by reference number 150, the display of the client device may display the error source information indicating that the bit error is occurring on the optical fiber cable and that the route/link flapping is occurring on the NIC of network device ND2.

In this way, a network device may automatically detect errors associated with a communication between multiple network devices and may automatically identify a source of the error. This enables faster identification of the source of the error (e.g., relative to manually identifying the source of the error) and faster remediation of the error, thereby reducing network downtime. In addition, automatic identification of the source of the error conserves processor resources of the network device that would be used to attempt to execute un-executable or erroneously written handwritten program code during manual testing. Further, this reduces or eliminate manual effort by a network administrator to identify the source of the error, thereby increasing an efficiency of identifying the source of the error.

As indicated above, FIGS. 1A-1D are provided merely as an example. Other examples are possible and may differ from what was described with regard to FIGS. 1A-1D.

Figure 2:
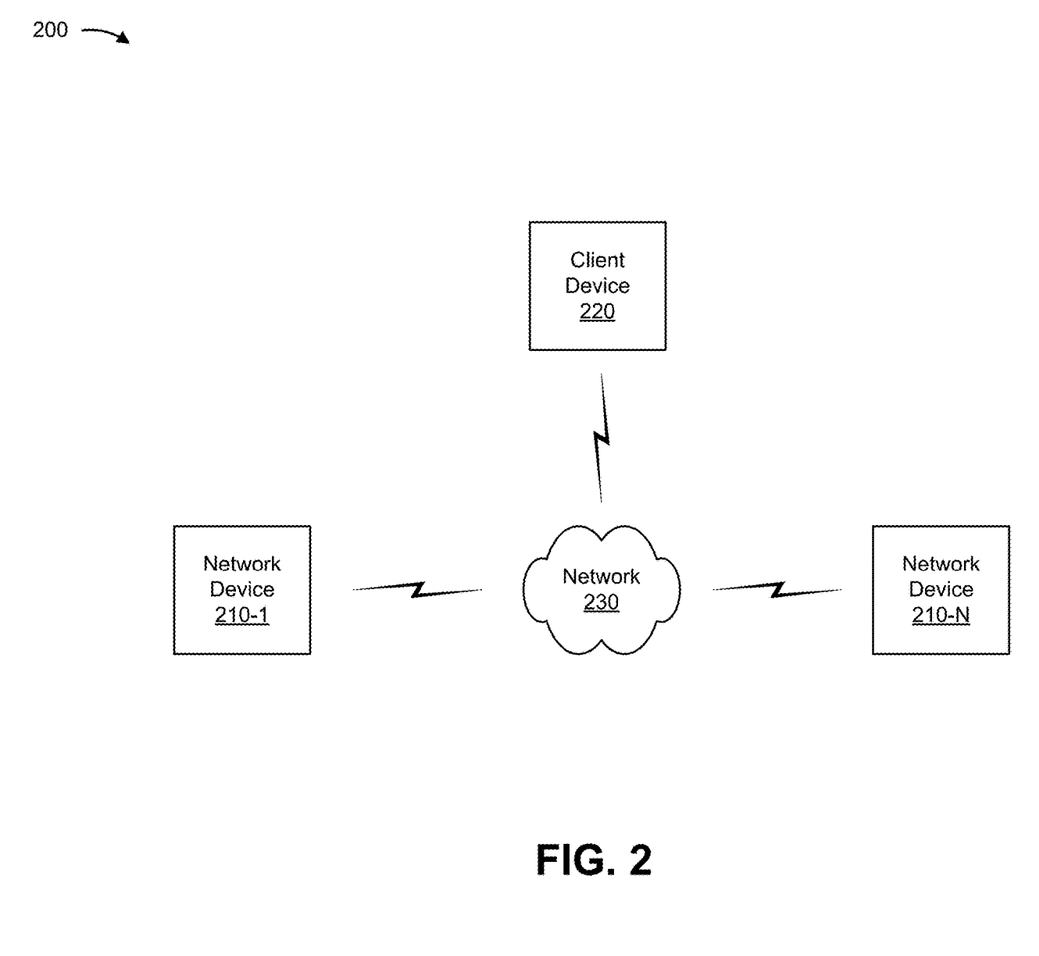
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as "network devices 210," and individually as "network device 210"), a client device 220, and a network 230. Devices of environment 200 may interconnect via wired connections, wireless connections, or a combination of wired and wireless connections.

Network device 210 includes one or more devices capable of receiving, storing, generating, and/or processing information, such as information associated with detecting an error in a communication. For example, network device 210 may include a router, a switch, a gateway, a hub, a bridge, a reverse proxy, a server (e.g., a proxy server, a web server, a host server, a storage server, or a server in a data center or cloud computing environment), a firewall, a security device, an intrusion detection device, a load balancer, or a similar device. In some implementations, network device 210 may monitor a communication between two network devices 210 to automatically detect an error associated with the communication, as described in more detail elsewhere herein. Additionally, or alternatively, network device 210 may automatically identify a source of the error, as described in more detail elsewhere herein.

Client device 220 includes one or more devices capable of receiving, generating, storing, processing, and/or providing information associated with an error in a communication. For example, client device 220 may include a communication and/or computing device, such as desktop computer, a laptop computer, a tablet computer, a server, a mobile phone (e.g., a smart phone or a radiotelephone), a wearable communication device (e.g., a smart wristwatch or a pair of smart eyeglasses), or a similar type of device. In some implementations, client device 220 may receive information identifying a source of the error, as described in more detail elsewhere herein. Additionally, or alternatively, client device 220 may provide the information for display (e.g., via a display of client device 220), as described in more detail elsewhere herein.

Network 230 includes one or more wired and/or wireless networks. For example, network 230 may include a cellular network (e.g., a long-term evolution (LTE) network, a 3G network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
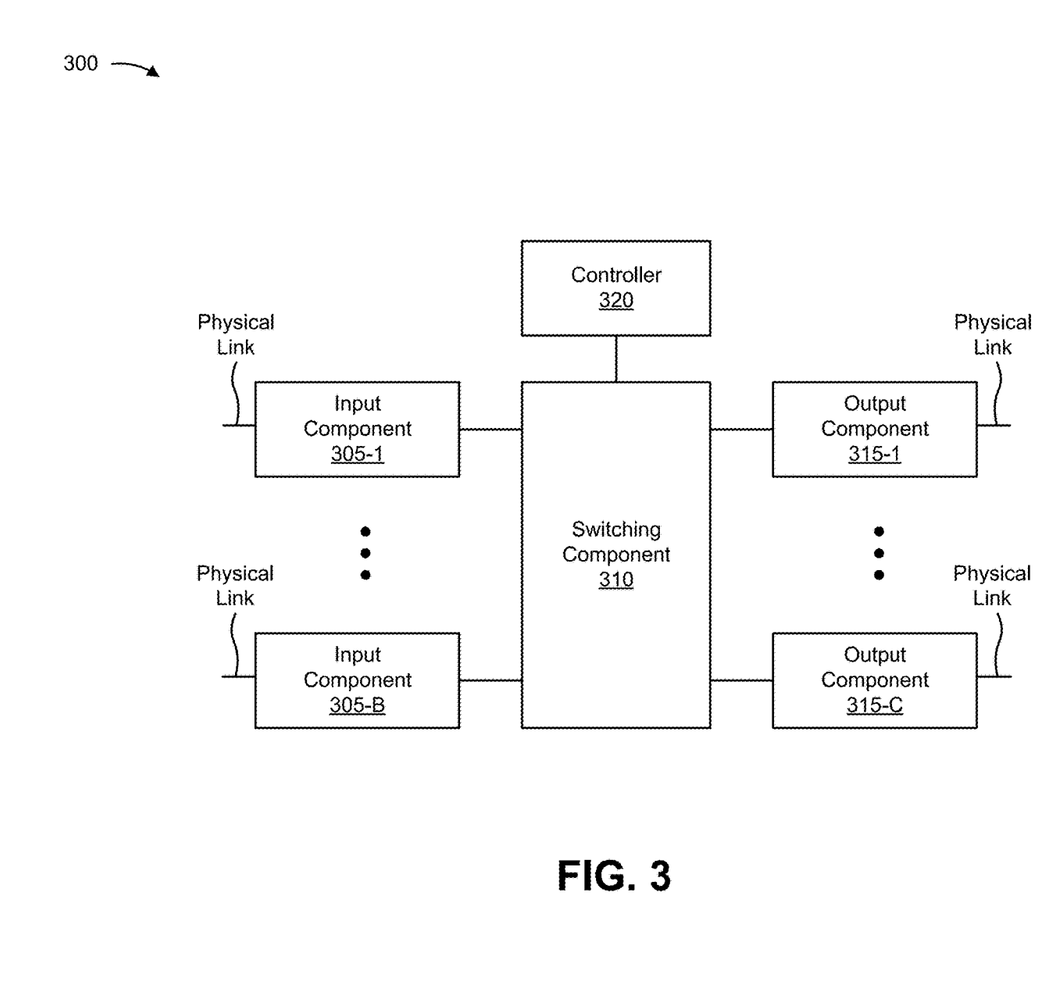
FIG. 3 is a diagram of example components of one or more devices of FIG. 2.

FIG. 3 is a diagram of example components of a device 300. Device 300 may correspond to network device 210 and/or client device 220. In some implementations, network device 210 and/or client device 220 may include one or more devices 300 and/or one or more components of device 300. As shown in FIG. 3, device 300 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a controller 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, device 300 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or controller 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, device 300 may include one or more output components 315. In some implementations, input component 305 and output component 315 may be implemented by the same set of components (e.g., and input/output component may be a combination of input component 305 and output component 315).

Controller 320 is implemented in hardware, firmware, or a combination of hardware and software. Controller 320 includes a processor in the form of, for example, a central processing unit (CPU), a graphics processing unit (GPU), an accelerated processing unit (APU), a microprocessor, a microcontroller, a field-programmable gate array (FPGA), an application-specific integrated circuit (ASIC), and/or another type of processor that can interpret and/or execute instructions. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 320 from another computer-readable medium or from another device via a communication interface. When executed, software instructions stored in a memory and/or storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
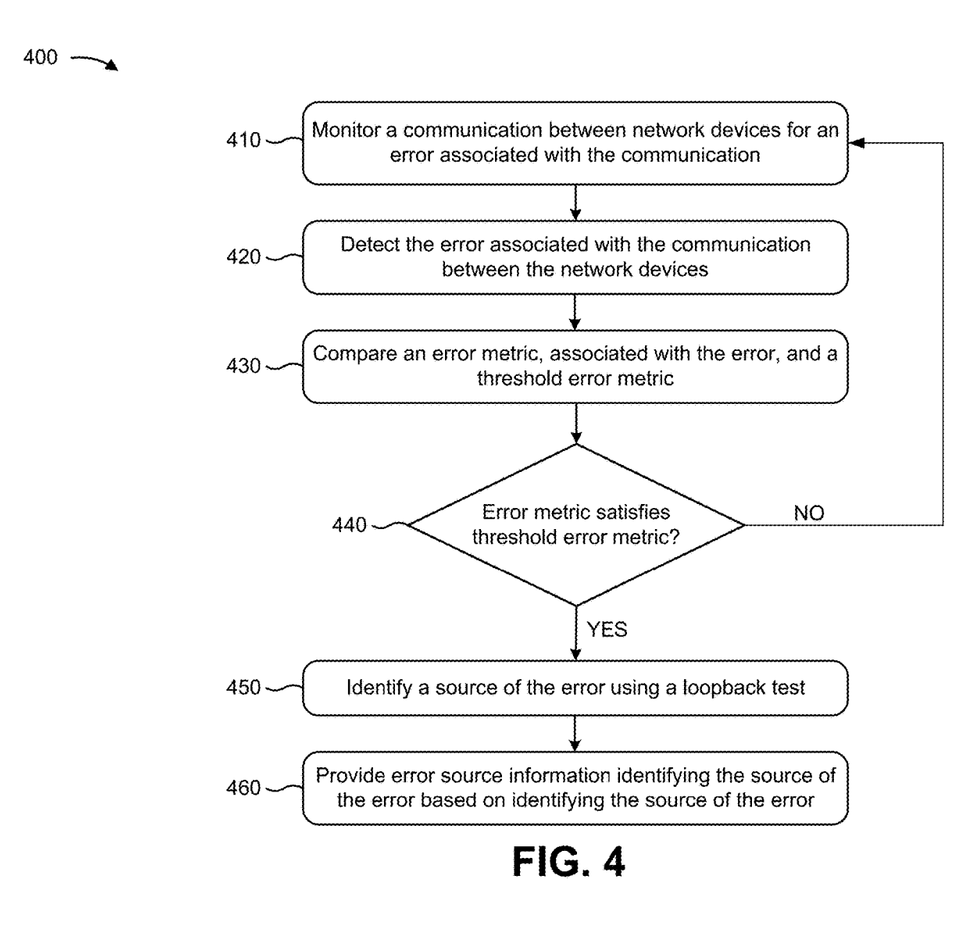
FIG. 4 is a flow chart of an example process for automatically detecting an error in a communication and automatically determining a source of the error.

FIG. 4 is a flow chart of an example process 400 for automatically detecting an error in a communication and automatically detecting a source of the error. In some implementations, one or more process blocks of FIG. 4 may be performed by network device 210. In some implementations, one or more process blocks of FIG. 4 may be performed by another device or a group of devices separate from or including network device 210, such as client device 220.

As shown in FIG. 4, process 400 may include monitoring a communication between network devices for an error associated with the communication (block 410) and detecting the error associated with the communication between the network devices (block 420). For example, a first network device 210 and a second network device 210 may be communicating via a transmission line (e.g., an optical fiber cable or a coaxial cable). In some implementations, the first network device 210 may monitor a communication between the first and second network devices 210. In some implementations, the second network device 210 may monitor a communication between the first and second network devices 210. In some implementations, both the first network device 210 and the second network device 210 may monitor a communication between the first and second network devices 210.

In some implementations, network device 210 may monitor the communication between network device 210 and another network device 210. For example, a first network device 210 may monitor a communication between the first network device 210 and a second network device 210. Additionally, or alternatively, network device 210 may monitor a communication between two other network devices 210. For example, a first network device 210 may monitor a communication between a second network device 210 and a third network device 210.

In some implementations, network device 210 may monitor the communication when network device 210 powers on or boots up. Additionally, or alternatively, network device 210 may monitor the communication based on input by a user of client device 220. Additionally, or alternatively, network device 210 may monitor the communication based on an instruction received from another device (e.g., another network device 210, a network management device, or the like). Additionally, or alternatively, network device 210 may monitor the communication based on a schedule (e.g., every day, from 5 AM to 12 AM; every hour for 15 minutes; every 30 seconds; or the like).

In some implementations, network device 210 may monitor the communication to detect an error associated with the communication between network devices 210. For example, network device 210 may monitor the communication to detect a bit error, route/link flapping, a loss of signal error, a frame check sequence (FCS) error, or another type of communication error.

In some implementations, network device 210 may detect the error based on monitoring the communication. For example, network device 210 may detect a bit error by detecting that bits of the communication have been altered, such as by using a hash function to generate a hash for the bits of the received communication and comparing the hash to another hash generated for the bits of the transmitted communication. In some implementations, network device 210 may detect a bit error when the comparison of the hashes associated with the received and transmitted communications do not match. As another example, network device 210 may detect route/link flapping by detecting that a communication between two network devices 210 has been interrupted due to one of the network devices 210 alternating between an up state and a down state. In some implementations, network device 210 may detect route/link flapping by monitoring a status (e.g., up/down, available/unavailable, etc.) of another network device 210.

As another example, network device 210 may detect a loss of signal error by detecting that a communication between two network devices 210 has been interrupted due to a loss of signal. In some implementations, network device 210 may detect the loss of signal error by monitoring a connection between network device 210 and another network device 210, for example, by failing to receive an expected response from the other network device 210. As another example, network device 210 may detect an FCS error by detecting that a calculated FCS number for a received communication does not match an FCS number included in a packet of the communication (e.g., an FCS number calculated by the sending network device 210).

In some implementations, the error may be caused by network device 210. For example, the error may be caused by a transceiver component (e.g., an optical transceiver component or a coaxial transceiver component) of network device 210. As another example, the error may be caused by a network interface controller (NIC) or line-card of network device 210. Additionally, or alternatively, the error may be caused by a transmission line. For example, the error may be caused by an optical fiber cable or a coaxial cable between network devices 210.

As further shown in FIG. 4, process 400 may include comparing an error metric, associated with the error, and a threshold error metric (block 430) and determining whether the error metric satisfies the threshold error metric (block 440). For example, network device 210 may determine an error metric, such as a bit error rate, a route/link flapping rate, a binary metric that indicates whether a signal is present between the network devices 210, a binary metric that indicates whether a calculated FCS number matches a received FCS number, etc. In some implementations, network device 210 may calculate the error metric (e.g., based on detecting the error). For example, network device 210 may calculate the number of bit errors in a communication to determine a bit error rate for the communication. Additionally, or alternatively, network device 210 may receive the error metric from another device, such as another network device 210.

In some implementations, network device 210 may determine the threshold error metric to use when comparing the error metric and the threshold error metric. For example, network device 210 may identify the threshold error metric based on the error detected (e.g., by using a data structure to identify the threshold error metric associated with the error detected). In some implementations, network device 210 may compare the error metric to a threshold error metric (e.g., by performing a comparison). For example, network device 210 may compare the error metric to a pre-configured threshold error metric, a default threshold error metric, or a threshold error metric configured by a network administrator via client device 220.

In some implementations, network device 210 may compare the error metric and the threshold error metric to determine whether the error metric satisfies the threshold error metric. In some implementations, network device 210 may perform an action based on determining whether the error metric satisfies the threshold error metric, as described below.

As further shown in FIG. 4, if the error metric does not satisfy the threshold error metric (block 440-NO), then process 400 may include returning to block 410. For example, if the error metric does not satisfy the threshold error metric, then network device 210 may continue to monitor the communication between network devices 210 for an error. In some implementations, network device 210 may reinitiate monitoring of the communication if network device 210 has previously ceased monitoring the communication.

As further shown in FIG. 4, if the error metric satisfies the threshold error metric (block 440-YES), then process 400 may include identifying a source of the error using a loopback test (block 450). For example, network device 210 may determine whether the error is caused by network device 210, another network device 210, and/or the transmission line. In some implementations, network device 210 may use a loopback test to identify a particular communication component as the source of the error.

For example, network device 210 may use a loopback test to identify a transmission line as the source of the error. As another example, a first network device 210 may use a loopback test to identify a first NIC of the first network device 210 or a second NIC of a second network device 210 as the source of the error. As another example, a first network device 210 may use a loopback test to identify a first transceiver component of the first network device 210 or a second transceiver component of a second network device 210 as the source of the error.

In some implementations, network device 210 may apply a loopback test to a communication component of network device 210. For example, network device 210 may apply the loopback test to a transceiver component, such as an optical transceiver or a coaxial transceiver, or a NIC, by monitoring whether the transceiver component or the NIC alter the signal. In some implementations, network device 210 may apply the loopback test to the communication component to determine whether the communication component is causing the error associated with the communication.

In some implementations, network device 210 may apply the loopback test to a transceiver component of network device 210 to determine whether the transceiver component is the source of the error. For example, network device 210 may transmit a signal to the transceiver component of network device 210. In some implementations, when network device 210 determines that the loopback test applied to the transceiver component results in a signal that has experienced an error, network device 210 may determine that the error is caused by the transceiver component of network device 210 and that the transceiver component is the source of the error. Conversely, in some implementations, when network device 210 determines that the loopback test applied to the transceiver component does not result in a signal that has experienced an error, network device 210 may determine that the error is not caused by the transceiver component and that the transceiver component is not the source of the error.

In some implementations, network device 210 may apply a loopback test to a NIC of network device 210 to determine whether the NIC is the source of the error. For example, network device 210 may transmit a signal to the NIC of network device 210. In some implementations, when network device 210 determines that the loopback test applied to the NIC results in a signal that has experienced an error, network device 210 may determine that the error is caused by the NIC and that the NIC is the source of the error. Conversely, in some implementations, when network device 210 determines that the loopback test applied to the NIC does not result in a signal that has experienced an error, network device 210 may determine that the error is not caused by the NIC and that the NIC is not the source of the error.

In some implementations, network device 210 may apply a local loopback test to a communication component of network device 210 determine whether the source of the error is a communication component of network device 210. For example, a first network device 210 may apply a local loopback test to a transceiver component of the first network device (e.g., a local transceiver component) and/or a NIC of the first network device 210 (e.g., a local NIC) by transmitting a signal to the transceiver component and/or the NIC of the first network device 210.

In some implementations, the first network device 210 may apply a local loopback test to determine whether the transceiver component and/or the NIC of the first network device 210 is the source of the error. In some implementations, when the local loopback test results in a signal that has experienced an error, the first network device 210 may determine that the source of the error is the transceiver component and/or the NIC of the first network device 210 (e.g., and not a transceiver component and/or a NIC of a second network device 210).

Additionally, or alternatively, network device 210 may apply a remote loopback test to a communication component of another network device 210 to determine whether the source of the error is the communication component of the other network device 210. For example, a first network device 210 may apply a remote loopback test to a transceiver component (e.g., a remote transceiver component) and/or a NIC (e.g., a remote NIC) of a second network device 210 by transmitting a signal to the transceiver component and/or the NIC of the second network device 210.

In some implementations, the first network device 210 may apply a remote loopback test to determine whether the transceiver component and/or the NIC of the second network device 210 is the source of the error. In some implementations, when the remote loopback test results in a signal that has experienced an error, the first network device 210 may determine that the source of the error is the transceiver component and/or the NIC of the second network device 210 (e.g., and not a transceiver component and/or a NIC of the first network device 210).

In some implementations, network device 210 may apply more than one type of loopback test to check for an error. For example, network device 210 may apply a pre-clock and data recovery (pre-CDR) loopback test, a post-CDR loopback test, and/or a serial loopback test. In some implementations, network device 210 may apply different types of loopback tests depending on the communication component being tested. For example, network device 210 may apply a first type of loopback test to a NIC or a transceiver component, such as a pre-CDR loopback test (e.g., a loopback test where a signal is returned prior to a transceiver component of a receiving network device 210 performing clock and data recovery). As another example, network device 210 may apply second type of loopback test to a transceiver component, such as a post-CDR loopback test (e.g., a loopback test where a signal is returned after a transceiver component of a receiving network device 210 has performed clock and data recovery).

As another example, network device 210 may apply a local loopback test to a local NIC (e.g., a NIC associated with network device 210) and a remote loopback to a remote NIC (e.g., a NIC associated with another network device 210), as described elsewhere herein. In some implementations, network device 210 may determine the type of loopback test to apply based the communication component to be tested (e.g., by using a data structure to identify the type of loopback test associated with the communication component to be tested).

In some implementations, network device 210 may apply multiple loopback tests to determine the source of the error. For example, network device 210 may combine results from applying a first loopback test and a second loopback test to determine the source of the error (e.g., by using a process of elimination to eliminate communication components as the source of the error). In some implementations, network device 210 may apply the multiple loopback tests in an order. For example, network device 210 may apply a loopback test to a transceiver component prior to applying a loopback test to a NIC. Applying the loopback test in an order may enable network device 210 to determine the source of the error by process of elimination. This enables network device 210 to conserve processor resources by reducing a quantity of loopback tests that network device 210 has to apply to identify the source of the error.

In some implementations, network device 210 may apply a second loopback test based on a result of a first loopback test. For example, network device 210 may apply the second loopback test when the first loopback test passes. As another example, network device 210 may apply the second loopback test when the first loopback test fails.

In some implementations, network device 210 may identify multiple errors when using a loopback test. For example, network device 210 may identify multiple errors of the same type, such as multiple bit errors or multiple FCS errors. As another example, network device 210 may identify multiple errors of different types, such as a bit error and an FCS error.

In some implementations, network device 210 may determine multiple sources for multiple errors. For example, network device 210 may identify a first communication component, such as a transmission line, and a second communication component, such as a transceiver component, as the sources for multiple first errors, such as multiple bit errors. As another example, network device 210 may identify a first communication component (e.g., a transmission line) as the source for a first error, such as a bit error, and a second communication component (e.g., a NIC) as the source for a second error, such as route/link flapping.

In this way, network device 210 may automatically identify a source of an error, thereby increasing an efficiency of determining the source of the error by reducing or eliminating the need for a network administrator to manually identify the source of the error. In addition, this increases an accuracy of identifying the source of the error (e.g., by identifying particular communication components of network device 210 causing the error), thereby improving determination of the error. Further, this enables faster identification of the source of the error (e.g., relative to manual identification), thereby reducing network downtime when identifying the source of the error.

As further shown in FIG. 4, process 400 may include providing error source information identifying the source of the error based on identifying the source of the error (block 460). For example, network device 210 may provide the error source information to client device 220 for display. As another example, network device 210 may transmit, to client device 220, a message (e.g., a text message or an email message) that includes the error source information.

As another example, network device 210 may provide the error source information to cause an auditory alarm, such as a siren, to be triggered upon identifying the source of the error. Using an auditory alarm enables network device 210 to notify a network administrator of identification of the source of the error using sound. As another example, network device 210 may provide the error source information to cause a visual alarm, such as a flashing light, to be triggered upon identifying the source of the error. Using a visual alarm enables network device 210 to visually notify a network administrator of identification of the source of the error.

As another example, network device 210 may provide the error source information to record the error source information in a log of error source information, thereby enabling a network administrator to access the error source information at a later time. As another example, network device 210 may provide the error source information to generate a simple network management protocol (SNMP) trap to notify a network management system of the identification of the error source. Providing an SNMP trap to a network management system may enable performance analysis and/or health diagnosis of network devices 210.

In some implementations, network device 210 may perform an action to remediate the error. For example, network device 210 may reconfigure communications between multiple network devices 210 to reroute traffic around the source of the error. This improves communications between the multiple network devices 210 by enabling network device 210 to maintain communications between the multiple network devices 210 while avoiding the source of the error.

In some implementations, network device 210 may reconfigure communications between multiple network devices 210 to use a back-up or an alternate communication component for a failed communication component. For example, network device 210 may reconfigure communications to use a back-up NIC or a back-up transceiver component. As another example, network device 210 may reconfigure communications to use a back-up transmission line between the multiple network devices 210. This improves communications between the multiple network devices 210 by avoiding the source of the error. In addition, this improves an efficiency of remediating the error by reducing or eliminating the need for a network administrator to manually replace communication components to remediate the error.

In some implementations, network device 210 may cause network device 210, or another network device 210, to be taken offline. This improves communications between multiple network devices 210 by removing the source of the error.

Additionally, or alternatively, network device 210 may cause another network device 210 to be brought online (e.g., in association with taking network device 210, or another network device 210, offline. This improves communications between multiple network devices 210 by enabling network device 210 to bring a properly network device 210 online.

In some implementations, network device 210 may schedule a technician or a network administrator to remediate the error (e.g., schedule on a calendar). For example, network device 210 may schedule the technician or the network administrator to troubleshoot or repair a failed communication component. This improves an efficiency of remediating the error by automatically scheduling remediation of the error.

In some implementations, network device 210 may automatically order a replacement communication component (e.g., to be installed by a technician or a network administrator). This improves an efficiency of remediating the error by automatically obtaining a replacement communication component for a technician or a network administrator.

In some implementations, network device 210 may reboot network device 210 or another network device 210. For example, network device 210 may reboot network device 210 to attempt to remediate the error. This improves an efficiency of remediating the error by attempting to use an automatic action to remediate the error prior to notifying a network administrator to manually remediate the error.

In this way, network device 210 may provide error source information, such as to a network administrator. This enables the network administrator to quickly and efficiently identify the source of the error and replace the communication component (e.g., a transmission line, a transceiver component, or a NIC) causing the error, thereby increasing an efficiency of correcting the source of the error. In addition, network device 210 may perform an action to remediate the error. This improves an efficiency of remediating the error by reducing or eliminating the need for manual remediation by a network administrator.

Although FIG. 4 was described with respect to a loopback test, other implementations are possible. For example, network device 210 may use a ping test or a traceroute test, alone or in combination with a loopback test, to identify the source of an error.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein enable a network device to automatically detect an error associated with a communication between network devices. In addition, the network device may automatically identify a source of the error. Automatically detecting the error and automatically identifying the source of the error enables faster, and more accurate, identification of the source of the error, thereby reducing network downtime. In addition, this reduces or eliminates the need for manual identification of the source of the error, thereby increasing an efficiency of identifying the source of the error. Further, this conserves processor resources during identification of the source by reducing or eliminating errors associated with manual identification of the source of the error, such as errors associated with handwritten program code.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
monitor a communication between network devices for an error associated with the communication;
detect the error associated with the communication between the network devices;
perform a comparison of an error metric and a threshold error metric,
the error metric being associated with the error;
determine whether the comparison indicates that the error metric satisfies the threshold error metric;
identify a source of the error using a loopback test based on determining whether the comparison indicates that the error metric satisfies the threshold error metric,
using the loopback test including applying the loopback test to a transceiver component of a network device, of the network devices, prior to applying the loopback test to a network interface controller (NIC) of the network device; and
provide error source information based on identifying the source of the error,
the error source information identifying the source of the error.

2. The device of claim 1, where the one or more processors are further to:
apply a first loopback test to a first network device, of the network devices, or a second loopback test to a second network device, of the network devices; and
determine whether the first loopback test or the second loopback test includes the error; and
where the one or more processors, when identifying the source of the error, are to:
identify the source of the error based on determining that the first loopback test or the second loopback test includes the error.

3. The device of claim 2, where the one or more processors, when applying the first loopback test to the first network device, are to:
apply the first loopback test to a transceiver component of the first network device, and
apply the first loopback test to a NIC of the first network device.

4. The device of claim 2, where the one or more processors, when applying the second loopback test to the second network device, are to:
apply the second loopback test to a transceiver component of the second network device, and
apply the second loopback test to a NIC of the second network device.

5. The device of claim 1, where the one or more processors, when identifying the source of the error, are to:
determine that the error metric satisfies the threshold error metric; and
identify the source of the error based on determining that the error metric satisfies the threshold error metric.

6. The device of claim 1, where the loopback test is a local loopback test associated with determining whether the source of the error is:
a local NIC, or
a local transceiver component.

7. The device of claim 1, where the loopback test is a remote loopback test associated with determining whether the source of the error is:
a remote NIC, or
a remote transceiver component.

8. A non-transitory computer-readable medium storing instructions, the instructions comprising:
one or more instructions that, when executed by one or more processors, cause the one or more processors to:
monitor a communication between multiple devices for an error associated with at least one of:
one or more network interface controllers (NICs) of the multiple devices,
one or more transceiver components of the multiple devices, or
one or more transmission lines between the multiple devices;
detect the error associated with the communication between the multiple devices;
determine whether an error metric satisfies a threshold error metric;
identify a source of the error using a loopback test based on determining whether the error metric satisfies the threshold error metric,
the loopback test being applied to a transceiver of a network device, of the one or more transceiver components, prior to applying the loopback test to a NIC of the network device, of the one or more NICs; and
provide error source information based on identifying the source of the error.

9. The non-transitory computer-readable medium of claim 8, where the one or more instructions, that cause the one or more processors to identify the source of the error, cause the one or more processors to:
apply a first local loopback test to a local NIC;
apply a second local loopback test to a local transceiver component;
detect the error in association with applying the first local loopback test or in association with applying the second local loopback test; and
identify the source of the error based on detecting the error.

10. The non-transitory computer-readable medium of claim 8, where the one or more instructions, that cause the one or more processors to identify the source of the error, cause the one or more processors to:
apply a first remote loopback test to a remote NIC;
apply a second remote loopback test to a remote transceiver component;
detect the error in association with applying the first remote loopback test or in association with applying the second remote loopback test; and identify the source of the error based on detecting the error.

11. The non-transitory computer-readable medium of claim 8, where the one or more instructions, that cause the one or more processors to identify the source of the error, cause the one or more processors to:
use the loopback test to detect the error on a transmission line of the one or more transmission lines;
detect the error in association with using the loopback test to detect the error on the transmission line; and
identify the source of the error based on detecting the error.

12. The non-transitory computer-readable medium of claim 8, where the one or more instructions, that cause the one or more processors to determine whether the error metric satisfies the threshold error metric, cause the one or more processors to:
perform a comparison of the error metric and the threshold error metric; and
determine whether the error metric satisfies the threshold error metric based on performing the comparison.

13. The non-transitory computer-readable medium of claim 8, where the one or more instructions, that cause the one or more processors to identify the source of the error, cause the one or more processors to:
apply the loopback test to a device of the multiple devices;
fail to detect the error based on applying the loopback test;
eliminate the device as the source of the error; and
identify the source of the error based on eliminating the device as the source of the error.

14. The non-transitory computer-readable medium of claim 8, where the error metric is:
an error metric calculated by a first device of the multiple devices, or
an error metric received by the first device from a second device.

15. A method, comprising:
monitoring, by a first device, a communication between the first device and a second device;
detecting, by the first device, an error associated with the communication between the first device and the second device,
the error being caused by the first device, the second device, or a transmission line used by the first device and the second device to communicate;
performing, by the first device, a comparison of an error metric and a threshold error metric,
the error metric being determined from the error;
determining, by the first device, that a result of the comparison indicates that the error metric satisfies the threshold error metric;
identifying, by the first device, a source of the error using a loopback test based on determining that the error metric satisfies the threshold error metric,
using the loopback test including applying the loopback test to a transceiver component of the first device or the second device prior to applying the loopback test to a network interface controller (NIC) of the first device or the second device; and
performing, by the first device, an action based on identifying the source of the error,
the action being associated with the source of the error.

16. The method of claim 15, where identifying the source of the error comprises:
identifying a communication component, of multiple communication components, that is causing the error, the multiple communication components including:
a first NIC of the first device,
a first transceiver component of the first device,
a second NIC of the second device,
a second transceiver component of the second device, or
the transmission line; and
identifying the source of the error based on identifying the communication component that is causing the error.

17. The method of claim 16, where identifying the communication component that is causing the error comprises:
applying the loopback test to the multiple communication components;
determining whether the loopback test results in a signal that has experienced the error; and
identifying the communication component, of the multiple communication components, that is causing the error based on determining whether the loopback test results in the signal that has experienced the error.

18. The method of claim 15, where identifying the source of the error comprises:
applying a local loopback test to multiple communication components of the first device; and
identifying the source of the error based on applying the local loopback test to the multiple communication components of the first device.

19. The method of claim 15, where identifying the source of the error comprises:
applying a remote loopback test to multiple communication components of the second device; and
identifying the source of the error based on applying the remote loopback test to the multiple communication components of the second device.

20. The method of claim 15, where identifying the source of the error comprises:
applying the loopback test to the first device or the second device;
determining that the loopback test failed to result in a signal that has experienced the error for two of:
the first device,
the second device, or
the transmission line; and
identifying the source of the error based on determining that the loopback test failed to result in the signal that has experienced the error.

* * * * *